March 6, 1928.  1,661,363
G. W. ELSEY
ARMATURE ASSEMBLING APPARATUS
Filed Jan. 12, 1926  3 Sheets-Sheet 1
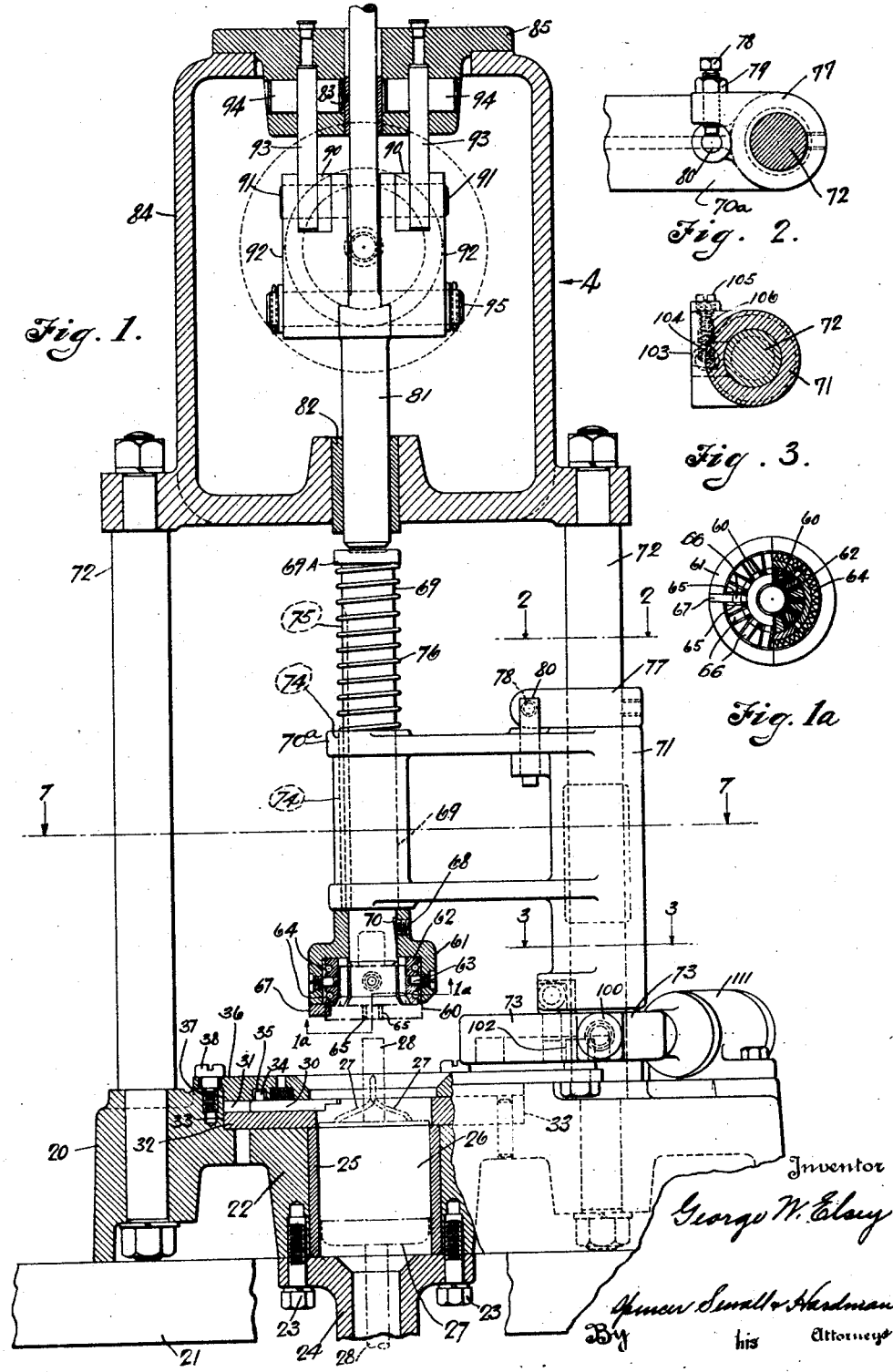

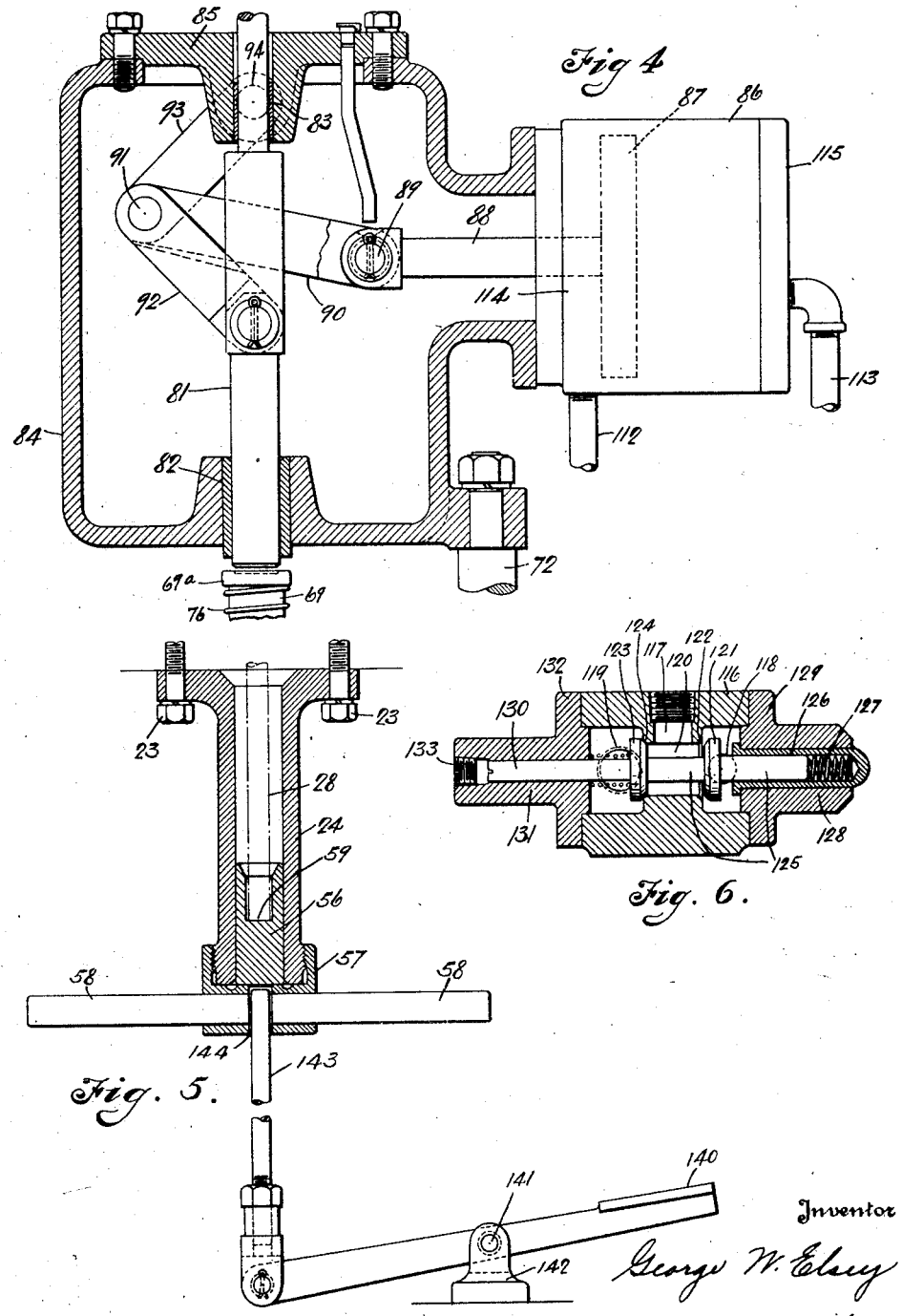

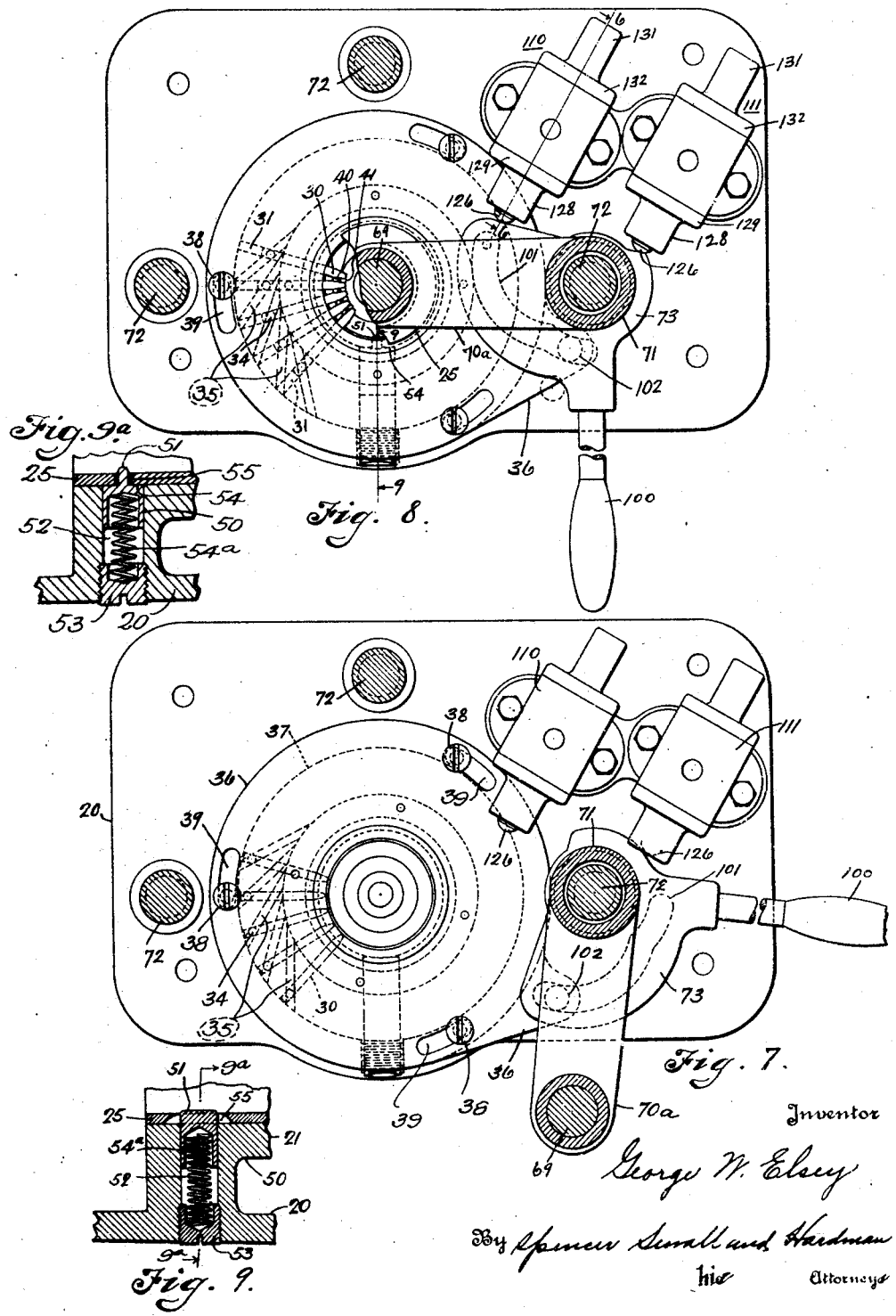

Patented Mar. 6, 1928.

1,661,363

UNITED STATES PATENT OFFICE.

GEORGE W. ELSEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

ARMATURE-ASSEMBLING APPARATUS.

Application filed January 12, 1926. Serial No. 80,760.

This invention relates to the manufacture of armatures for dynamo-electric machines.

It is among the objects of the invention to reduce the cost of assembling the commutator upon the armature shaft, and to this end the invention provides a machine for facilitating the rapid assembly of commutator and armature shafts.

Further objects and advantages of the present invention will be apparent from the following description, reference being had to the accompanying drawings, wherein a preferred form of embodiment of the present invention is clearly shown.

In the drawings:

Fig. 1 is a fragmentary side view partly in section of a machine embodying the present invention.

Fig. 1ª is a sectional view taken along the line 1ª—1ª of Fig. 1.

Figs. 2 and 3 are sectional views on the lines 2—2 and 3—3 respectively of Fig. 1.

Fig. 4 is a side view partly in section of the power operating mechanism for the machine shown in Fig. 1. This view being taken in the direction of the arrow 4 in Fig. 1.

Fig. 5 is a vertical sectional view of the machine and forms a continuation of the view shown in Fig. 1.

Fig. 6 is a sectional view on the line 6—6 of Fig. 7 showing one of the valves for controlling the pressure fluid admitted to the cylinder shown in Fig. 4.

Figs. 7 and 8 are sectional views on the line 7—7 of Fig. 1 showing the apparatus in two positions of operation.

Fig. 9 is a sectional view on the line 9—9 of Fig. 8.

Fig. 9ª is a sectional view taken along the line 9ª—9ª of Fig. 9.

The machine which is about to be described, comprises chiefly (1) a fixture for receiving an assembly of an armature, a shaft, a core and windings, (2) means for maintaining the ends of the armature windings in correct spaced relation so that they may be received by notches in the risers of the commutator bars, (3) a fixture for temporarily holding the commutator and keeping it in alignment with the armature core prior to assembling it on the core, (4) power operated means for pressing the commutator upon the armature shaft, and (5) mechanism for moving the commutator fixture into alignment with the armature shaft and for causing the armature conductor leads to be maintained in correct spaced relation and for causing the power means to operate to press the commutator upon the shaft.

*Armature support.*

The machine includes a base 20 which is adapted to be supported by a table 21. The base 20 is provided with a centrally apertured boss 22 to which is attached by bolts 23 a tubular member 24. In alignment with the tube 24 the boss 22 supports a sleeve 25 adapted to receive an armature assembly which is indicated by the relatively fine dot and dash lines in Fig. 1. This assembly includes a core 26 carrying windings 27 and mounted on a shaft 28.

In order to locate the armature core correctly relative to the armature support there is provided a locating plunger 50 (shown in section in Figs. 9 and 9ª) having a relatively narrow projection 51 adapted to be received by one of the armature core slots. The plunger 50 is slidable within a recess 52 provided by the base 20. The outer end of the recess 52 is closed by a plug 53. As shown in Fig. 9ª, the plunger 50 has a shoulder 54 providing a projection 51. This projection extends through a slot 55 in the sleeve 25. Spring 54ª, interposed between the plug and the plunger 50, maintains the shoulder 54 yieldably against the outer surface of the sleeve 25.

Referring to Fig. 5 the lower end of the shaft 28 is supported by a block 56 which is received by the tube 24 and is supported by a nut 57 threadedly engaging the sleeve 24. The nut 57 is turned by rods 58 extending therefrom. The particular block 56 which is shown in the drawing is replaceable by other blocks of different dimensions determined by the longitudinal dimension of the armature core and shaft assembly. It is apparent that the distance between the base 20 and the bottom surface 59 of the recess in the block 56 will determine the endwise location of the commutator relative to the armature shaft.

*Means for maintaining the ends of the armature windings in correct spaced relation.*

The means for maintaining the ends of the armature windings in correct spaced relation so that they may be received by the notches in the risers of the commutator bars comprises a plurality of radially movable slides 30 which are guided by radially disposed notches 31 located in a disc 32 which is supported within a recess 33 provided by the base 20. Each slide 30 carries a stud 34 which is received by a groove 35 provided by a rotatable disc 36 having a journal portion 37 which is received by the recess 33. The disc 36 is retained upon base 20 by screws 38 which pass through slots 39 in the disc. The grooves 35 are oblique to the radial notches 31 and are so disposed that the rotation of the disc 36 counter-clockwise from the position shown in Fig. 7 to the position shown in Fig. 8 will cause the slides 30 to move inwardly toward the armature shaft 28 as shown in Fig. 8. The slides 30 have wedge shaped ends which are adapted to extend between the ends of the armature conductors and to maintain them in the desired spaced relation. As shown in Fig. 8 numeral 40 refers to the armature conductor ends which are located in an outer circular row concentric with the armature shaft, and numeral 41 refers to those conductor ends which are located in an inner circular row.

Commutator supporting fixture.

In Fig. 1 the relatively heavy dot and dash lines indicate the outline of a commutator 60 which is to be pressed upon the armature shaft 28. The fixture for supporting the commutator 60 includes an inverted cup shaped member 61 which receives four clamping segments 62 each of which is supported by the end of a screw 63 carried by cup 61. These clamping segments 62 are yieldingly urged against the commutator 60 by two continuous coil springs 64 which are received by suitable grooves in the segments 62, thus the commutator is maintained frictionally in the position shown in Fig. 1. Numeral 65 indicates one of the notched risers which is to receive a pair of armature conductor ends 40 and 41. In Figs. 1ᵃ, which is a bottom view of the commutator fixture, numeral 66 indicates a space between adjacent commutator risers 65. In order to locate the commutator 60 correctly with respect to the armature core 26 the cup 61 is provided with a lug 67 which is received by one of the spaces 66.

The cup 61 is secured by a screw 68 to a rod 69 having a flat 70 engaged by the screw 68. Therefore, the cup 61 is not rotatable relative to the rod 69. Rod 69 is guided for vertical movement by a bracket 70ᵃ having a hub 71 which is rotatable about one of two posts 72 which are supported by the base 20. The lower end of the hub 71 rests upon a cam 73 which is rotatable about the post 72 and is supported by the base 20.

The bracket 70ᵃ carries a key 74 which is received by a key-way 75 provided in the rod 69. Therefore, rod 69 is non-rotatable relative to the bracket 70ᵃ. Rod 69 is maintained in the upper position shown in Fig. 1 by a spring 76 located between the bracket 70ᵃ and a shoulder 69ᴬ provided by the rod 69.

By mechanism to be described the bracket 70ᵃ is moved from the commutator loading and unloading position shown in Fig. 7 to the position shown in Fig. 8 in which the commutator is located in alignment with the armature shaft. A collar 77 is fixed to the right hand post 72 and carries a set screw 78 located in adjusted position by a lock nut 79 and adapted to engage a pin 80 carried by the bracket 70ᵃ. The screw 78 provides a stop which is adjustable in order to cause the commutator to be located in alignment with the armature shaft when the pin 80 engages the screw 78 as shown in Fig. 2.

Power operated mechanism.

The power operated mechanism for pressing the commutator upon the armature shaft includes a plunger 81 which is guided by bearings 82 and 83 provided respectively by a housing 84 and a housing cover 85. The housing 84 is supported by the posts 72 as clearly shown in Fig. 1. Housing 84 supports a fluid pressure cylinder 86 containing a piston 87 which is attached to a rod 88. Rod 88 carries a pin 89 which is connected by links 90 with pins 91 which connect pairs of toggle links 92 and 93. The links 93 are connected at their upper ends with pins 94 supported by the cover 85. The links 92 are connected at their lower ends with the plunger 81 by a pin 95. It is obvious that the admission of a pressure fluid in the cylinder 86 to the left of the piston 87 will cause the piston to move to the right and the toggle links 92 and 93 to be straightened so that the plunger 81 will move downwardly. When pressure fluid is admitted to the cylinder 86 to the right of the piston 87 the piston will be moved to the left to return the power operated mechanism to the position shown in Figs. 1 and 4.

Control mechanism.

The mechanism which controls the movements of the spacing slides 30 and of the brackets 70ᵃ and the operation of the toggle mechanism just described comprises the cam 73 which is rotated manually by a handle 100. The cam 73 is provided with a cam slot 101 which receives a stud 102 attached to the plate 36. Rotation of the cam 73 from the position shown in Fig. 7 to that shown in Fig. 8 will cause the plate 36 to be moved counter-clockwise in order that the slides 30 may be advanced toward the work as shown in Fig. 8. This movement of the cam 73 causes the bracket 70ª to be moved from the position shown in Fig. 7 to that shown in Fig. 8 by means of connection which include a lug 103 (shown in Fig. 3) attached to the cam 73, and a spring 104 which transmits motion in a counter-clockwise direction from the lug 103 to a plug 105 which closes one end of a recess 106 provided in the hub 71 of the bracket 70ª for the purpose of receiving the spring 104. Thus the bracket 70ª is moved into the position shown in Fig. 8 by movement of the handle 100 in a counter-clockwise direction, and the pin 80 is yieldingly pressed against the stop screw 78.

The cam 73 also controls two valves 110 and 111 which respectively control the passage of pressure fluid through pipes 112 and 113 which are connected respectively with the stuffing box end 114 and the head end 115 of the cylinder 86.

As shown in Fig. 6 either valve 110 or 111 comprises a valve body 116 having an inlet passage 117, an exhaust passage 118 and an outlet passage 119. The passage 117 leads into an intermediate passage 120 which will be connected with the exhaust passage 118 when the valve 121 is separated from its seat 122. But when the valve 121 is closed and a valve 123 is separated from its seat 124 then the passage 120 will be connected with the outlet passage 119. The valve 121 is supported by a stem 125 which is slidable in a plunger 126 closed at its outer end. A spring 127 is located between the closed end of the plunger 126 and the valve stem 125. The plunger 126 is slidable through a bearing 128 provided by a cover 129 for one end of the valve body. The valve 123 is carried by a stem 130 slidably through a bearing 131 which is provided by the cover 132 for the other end of the body 116. A plug 133 closes the central opening in the cover 132. It is apparent, therefore, that when the plunger 126 is pushed inwardly the valve inlet passage 117 and the outlet passage 119 will be connected, and the exhaust passage 118 disconnected.

The plungers 126 of the valves 110 and 111 are located in the path of movement of the cam 73. When the bracket 70ª is in the position shown in Fig. 7 the plunger 126 of the valve 111 is pushed inwardly so that the pressure fluid will be admitted through the pipe 113 to the head end of the cylinder 86 thereby causing the power operating mechanism to be moved into the position shown in Fig. 4. The cam being out of engagement with the plunger 126 of the valve 110, this valve will cause the stuffing box end of the cylinder to be connected with atmosphere through the pipe 112 of the exhaust passage of the valve 110. Movement of the lever 100 in a clockwise direction first causes the slides 30 to be advanced between the pairs of ends of the armature conductors to maintain them in proper alignment with the commutator riser notches which are to receive the bars, and movement of the lever 100 in this direction will cause the commutator which has been placed within the holder cup 61 to be located in alignment with an armature which has been placed within the fixture as previously described. Moving the lever 100 in this same direction after the work pieces are in condition to be assembled will cause the cam 73 to move away from the plunger 126 of the valve 111 and to engage the plunger 126 of the valve 110. This will cause pressure fluid to be admitted to the stuffing box end of the cylinder 86 through the valve 110 and the pipe 112. At the same time the head end of the cylinder will be connected with atmosphere through the pipe 113 and the exhaust passage in the valve 11. Therefore, the piston 87 will move toward the right to straighten the toggle links 92 and 93 and to cause the plunger 126 to move downwardly so that the latter will move the rod 69 and the commutator 60 downwardly over the shaft 28. As the commutator is pressed-fitted to the shaft it will remain attached to the shaft while the rod 69 and the commutator head 61 are elevated. This operation is accomplished by moving the lever 100 from the position shown in Fig. 8 to that shown in Fig. 7.

After the commutator and shaft assembling operation has been performed the armature is removed from the fixture. Should the armature tend to stick to the sleeve 25, removal of the armature is facilitated by the operator pressing downwardly on a pedal 140 pivoted at 141 upon a stationary bracket 142. Clockwise movement of the pedal as viewed in Fig. 5 causes a rod 143 connected with the pedal to move upwardly through a suitable opening 144 in the nut 57 and to move the armature shaft supporting block 56 upwardly. Therefore, this operation will assist in dislodging the armature core from the sleeve 25.

It is therefore apparent from the foregoing description that the commutator may be assembled upon the armature shaft with great rapidity. The operator is preferably seated in front of the machine, the handle 100 being at the right of the operator, with the right hand the operator may place a commutator within the holder 61 then grasp the handle 100 and move it toward him. The work of aligning and assembling operations are preformed automatically. After the assembly the operator moves the handle 100 away from him and uses the left hand to remove the assembled armature from the fixture, the work of removal being assisted by operating the pedal 140 when necessary.

While the form of embodiment of the present invention as herein disclosed, constitutes a preferred form, it is to be understood that other forms might be adopted, all coming within the scope of the claims which follow.

What is claimed is as follows:

1. Armature assembling apparatus comprising, in combination, work holders adapted to hold an armature shaft and a commutator in alignment, power operated means for causing one of the holders to move axially relative to the other, and means for moving one of the holders relative to the other to cause the shaft and commutator to become aligned, and for effecting the operation of the power means after the holders are in alignment.

2. Armature assembling apparatus comprising, in combination, work holders adapted to hold an armature shaft and a commutator in alignment, power operated means for causing the commutator holder to move axially relative to the shaft holder, and means for moving the commutator holder into and out of alignment with the shaft holder and for effecting the operation of power means after the commutator holder has been moved into alignment with the shaft holder.

3. Armature assembling apparatus comprising in combination, work holders adapted to hold an armature shaft and a commutator in alignment, one of the holders being stationary, power means including an endwise movable plunger in alignment with the stationary holder, a rod carrying the other holder and movable between the plunger and stationary holder and into alignment therewith, a movable bracket carrying the rod, and means for moving the bracket so as to align the rod and movable holder with the plunger and stationary holder and for effecting the movement of the plunger toward the rod after the movable holder has been aligned with the stationary holder.

4. Armature assembling apparatus comprising, in combination, work holders adapted respectively to hold in alignment a commutator and an assembly of armature shaft, core and conductors, means for moving one of the holders axially relative to the other to drive the commutator upon the shaft, means for moving the conductor ends into alignment with the risers to which they are respectively to be connected, and means having a common operating member for moving one of the work holders transversely into alignment with the other holder and for effecting the operation of the conductor-end-aligning-means.

5. Armature assembling apparatus comprising, in combination, work holders adapted respectively to hold in alignment a commutator and an assembly of armature shaft, core and conductors, means for moving one of the holders axially relative to the other to drive the commutator upon the shaft, means for moving the conductor ends into alignment with the risers to which they are respectively to be connected, and means having a common operating member for moving the commutator holder transversely into alignment with the other holder, and for effecting the operation of the conductor-end-aligning-means.

6. Armature assembling apparatus comprising, in combination, work holders adapted respectively to hold in alignment a commutator and an assembly of armature shaft, core and conductors, means for moving the commutator holder axially relative to the other holder to drive the commutator upon the shaft, means for moving the conductor ends into alignment with the risers to which they are respectively to be connected, and means having a common operating member for moving the commutator holder transversely into alignment with the other holder and for effecting the operation of the conductor-end-aligning-means.

7. Armature assembling apparatus comprising, in combination, work holders adapted respectively to hold in alignment a commutator and an assembly of armature shaft, core and conductors, power means for moving one of the holders axially relative to the other to drive the commutator upon the shaft, a controller for the power means, means for moving the conductor ends into alignment with the risers to which they are respectively to be connected, and means including a common operating member for effecting the operation of the conductor-end-aligning-means and then the actuation of the controller to cause the power means to drive the commutator upon the shaft.

8. Apparatus defined by claim 7 in which the power means moves the commutator holder axially relative to the other holder.

9. Armature assembling apparatus comprising, in combination, work holders adapted respectively to hold in alignment a commutator and an assembly of armature shaft, core and conductor, power means for moving one of the holders axially relative to the other to drive the commutator upon the shaft, a controller for the power means, means for moving the conductor ends into alignment with the risers to which they are respectively to be connected, and means including a common operating member for moving one of the work holders transversely into alignment with the other work holder and for effecting the operation of the conductor-end-aligning-means and then the actuation of the controller to cause the power means to drive the commutator upon the shaft.

10. Assembling apparatus for armatures including a shaft and a commutator, comprising in combination, an armature support; a commutator supporting fixture adapted to hold the commutator in proper axial and radial alignment with the armature shaft; and means for producing axial movement of one of said supports relative to the other, to cause the commutator to be forced upon the armature shaft.

11. Assembling apparatus for armatures including a shaft and a commutator, comprising in combination, an armature support; a commutator supporting fixture including means for frictionally holding the commutator in proper axial and radial alignment with the armature shaft; and means for producing axial movement of one of said supports relative to the other, to cause the commutator to be forced upon the armature shaft.

12. Assembling apparatus for armatures including a shaft and a commutator, comprising in combination, an armature support; a commutator supporting fixture pivotally supported and adapted to swing the commutator into proper axial and radial alignment with the armature shaft; and means for producing axial movement of one of said supports relative to the other when they are axially aligned, to cause the commutator to be pressed upon the armature shaft.

13. Assembling apparatus for armatures including a shaft and a commutator, comprising in combination, a support adapted to hold the armature against movement; a pivoted arm; a non-rotatable plunger slidably supported by said arm; a commutator supporting fixture rigidly secured to said plunger; means for swinging the arm so as to bring the said supporting fixture in axial alignment with the armature shaft; means in said fixture for properly locating the commutator therein so that it will properly align, axially and radially, with the shaft when the fixture is swung into alignment with said shaft; and means for moving the plunger toward the armature to cause the commutator to be pressed upon the armature shaft.

14. Assembling apparatus for armatures including a shaft and a commutator, comprising in combination, a support adapted to hold the armature against movement; a pivoted arm; a non-rotatable plunger slidably supported by said arm; a commutator supporting fixture rigidly secured to said plunger; means for swinging the arm so as to bring the said supporting fixture in axial alignment with the armature shaft; means in said fixture for properly locating the commutator therein so that it will properly align, axially and radially, with the shaft when the fixture is swung into alignment with said shaft; means on said commutator supporting fixture for engaging the armature to maintain said armature and fixture in proper radial alignment; and means for moving the plunger toward the armature to cause the commutator to be pressed upon the armature shaft.

In testimony whereof I hereto affix my signature.

GEORGE W. ELSEY.